(12) United States Patent
Meltzer

(10) Patent No.: US 7,163,244 B2
(45) Date of Patent: Jan. 16, 2007

(54) MULTI-PURPOSE IMPACT ABSORBENT UNITS

(76) Inventor: Jack Meltzer, 60 Columbia Ave. Apt. 13, Dumont, NJ (US) 07628

( * ) Notice: Subject to any disclaimer, the term of this patent is extended or adjusted under 35 U.S.C. 154(b) by 0 days.

(21) Appl. No.: 10/897,511

(22) Filed: Jul. 21, 2004

(65) Prior Publication Data
US 2006/0017296 A1    Jan. 26, 2006

(51) Int. Cl.
*B60R 19/42* (2006.01)
(52) U.S. Cl. ......................... 293/128; 438/31
(58) Field of Classification Search ................ 293/128; 428/31
See application file for complete search history.

(56) References Cited
U.S. PATENT DOCUMENTS 3,842,564 A * 10/1974 Brown .................. 52/717.03
4,066,285 A * 1/1978 Hall et al. ................ 293/120
4,351,868 A * 9/1982 Otani ....................... 428/120
4,360,549 A * 11/1982 Ozawa et al. ............... 428/31
4,946,727 A * 8/1990 Kessler ....................... 428/99
D315,542 S * 3/1991 Dalton et al. .............. D12/217
5,149,569 A * 9/1992 McCue ....................... 428/31
5,188,408 A * 2/1993 Berdan et al. ............. 293/155
5,202,172 A * 4/1993 Graf ........................... 428/100
5,242,734 A * 9/1993 Rubin ........................ 428/100
5,520,765 A * 5/1996 Zoller ........................ 156/245
5,705,236 A * 1/1998 Eraybar et al. .............. 428/31
6,527,319 B1 * 3/2003 Martel ........................ 293/128

* cited by examiner

Primary Examiner—Joseph D. Pape
(74) Attorney, Agent, or Firm—Arthur M. Peslak

(57) ABSTRACT

What is disclosed is a device directed to protecting surfaces from damage due to low-impact forces. The device is fabricated from resilient plastic material that will absorb such forces and return to its original shape without breaking or permanent deformation. The device disclosed is semi-circular in cross-section and is adhered to the surface to be protected by EZ-ON means of double-sided adhesive tape or alternatively by flexing onto a bracket.

1 Claim, 4 Drawing Sheets

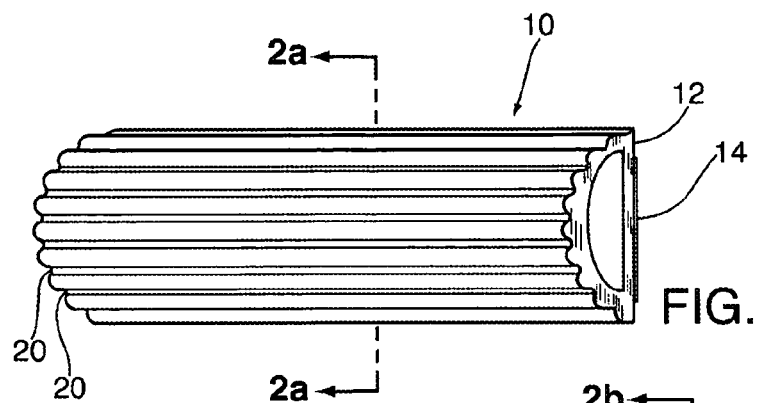
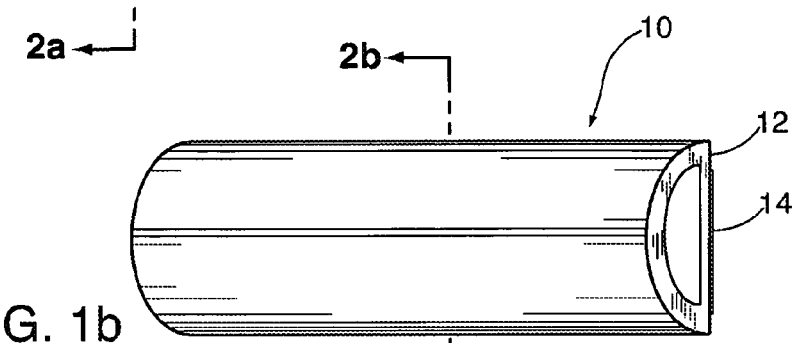
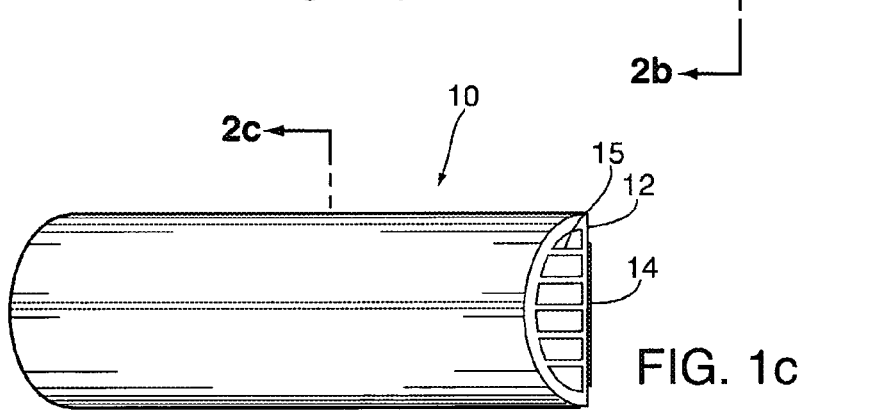
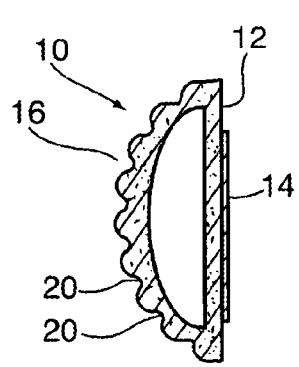 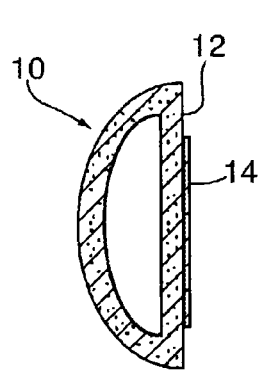 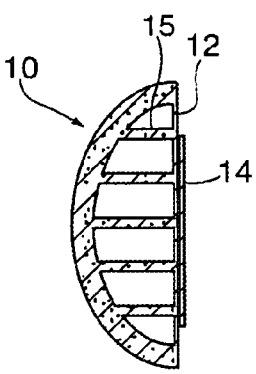
FIG. 2a          FIG. 2b          FIG. 2c

MULTI-PURPOSE IMPACT ABSORBENT UNITS

BACKGROUND OF THE INVENTION

The present invention is directed to a multi-purpose device for protecting surfaces from slow speed collisions. The present invention can be applied to an automobile bumper to protect the automobile from damage in slow speed accidents. The device can also be adapted for use on automobile side doors to protect the doors from dents in a parking lot when doors are opened or closed. However, the present invention should not be limited to automobile applications only. Rather, the present invention can be readily adapted to other surfaces that need protection including but not limited to loading docks at warehouses for trucks or at boat docks. Thus, the present invention can be utilized to protect any possible impact area with flexible built-in impact protection.

SUMMARY OF THE INVENTION

The present invention is directed to a device to be adhered to an automobile bumper, automobile side door, or other surface requiring protection from slow-speed collisions. The device is generally hollow and comprises a resilient compressible material of a length, width, height and generally semi-circular cross-section. The device further comprises an adhesive or other means adapted for attaching the device to the surface to be protected. In one embodiment, the EZ-ON double-backed adhesive tape is utilized while a bracket is utilized in an alternative embodiment to FLEX-ON the device to the surface to be protected.

BRIEF DESCRIPTION OF THE DRAWINGS

FIGS. 1a, b, c are plan views of three embodiments of the device of the present invention.

FIGS. 2a, b, c, are cross-section views of three embodiments of the device shown in FIGS. 1a, b, c respectively.

DETAILED DESCRIPTION OF THE INVENTION

Figure 3:
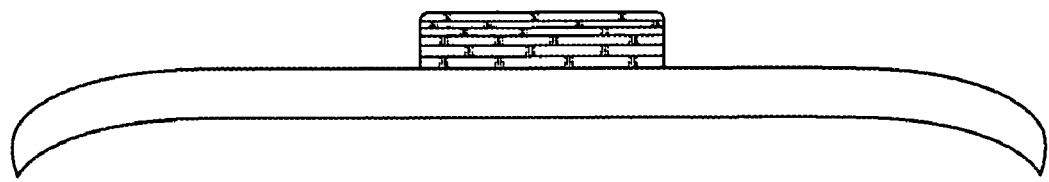
FIG. 3 is a plan view of a device of the present invention as applied to a straight bumper of an automobile.
Figure 4:
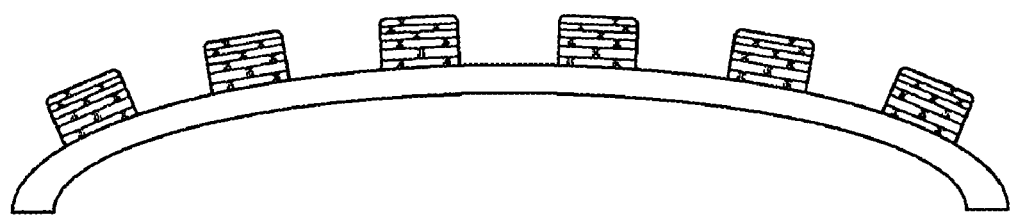
FIG. 4 is a plan view of a device of the present invention as applied to a curved automobile bumper.

The present invention will now be described in terms of the presently preferred embodiment as illustrated in the drawings. However, those of ordinary skill in the art will recognize that many obvious modifications may be made thereto without departing from the spirit or scope of the invention as set forth in the appended claims.

The bumper guard 10 of the present invention is illustrated in FIG. 1 and FIG. 2. The bumper guard 10 is generally semi-circular in cross-section and all three embodiments are generally hollow. The bumper guard can be a variety of different lengths "L" depending upon the application.

For example, when applied to a straight surface of an automobile bumper, it is presently contemplated that the length will be approximately 7.0 inches with a width of 3.5 inches and height of 3.5 inches. The width is about 1 inch, the length 3.5 inches and the height 3.5 inches when applied on a side door of the automobile or to a curved portion of the bumper. In one embodiment of the present invention, the flat surface 12 of the bumper guard 10 will be provided with double-backed adhesive tape with covering tape 14. The double-backed adhesive tape will first be adhered to the flat surface 12 during manufacture and the covering tape will remain in place. When installing the bumper guard 10, the covering tape 14 will be removed from the double-backed tape to expose the adhesive and then the bumper guard 10 will be adhered to a surface, such as a bumper to be protected by the bumper guard 10. The semi-circular surface 16 of the bumper guard 10 will then protrude from the surface to be protected. Thereby, the surface will be protected from slow speed impacts.

The semi-circular outer surface 16 of the bumper guard 10 shown in FIGS. 1a and 2a comprises a plurality of longitudinal recesses 20. The longitudinal recesses 20 allow the bumper guard 10 to absorb a higher impact force than a merely smooth surface. The bumper guard 10 in FIGS. 1b and 2b comprises a smooth outer surface. The bumper guard 10 illustrated in FIGS. 1c and 2c is partially hollow with a plurality of internal spines 15.

Figure 5A:
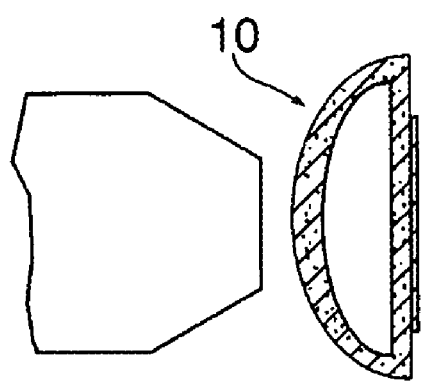
FIGS. 5a, b, c, illustrate the device of the present invention just prior to, during and just after a collision respectively.
Figure 5B:
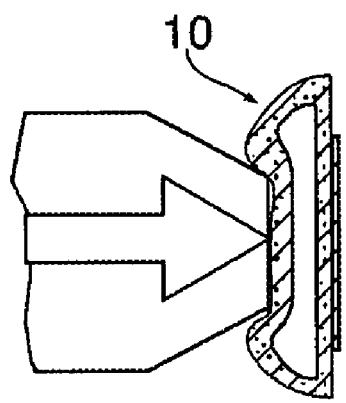
Figure 5C:
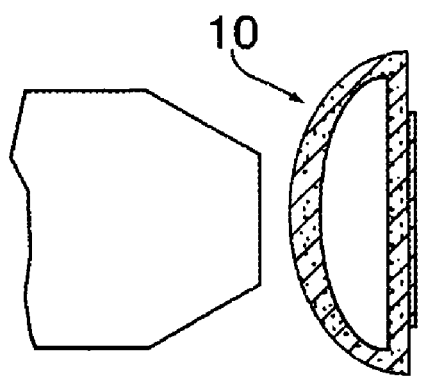

The bumper guard 10 can be fabricated from resilient flexible plastic material that absorbs the force of a slow speed impact by compressing upon impact and then returning to its original semi-circular shape without breaking or cracking as illustrated in FIGS. 5a, 5b and 5c. The hollow interiors shown in the embodiments allow the bumper guard 10 to absorb pressure from the impact and then return to its original shape. It is presently contemplated that the bumper guard 10 will be fabricated from resilient polyethylene, vinyl or similar material. This type of material is resilient and flexible but will not dry up when exposed to the elements and become brittle. If the material were to become brittle when exposed to the elements, then the purpose of the present invention would be defeated by such a material. However, it is contemplated that other materials with the same or similar characteristics as polyethylene without plasticizers can be substituted without departing from the spirit or scope of the present invention.

Figure 6:
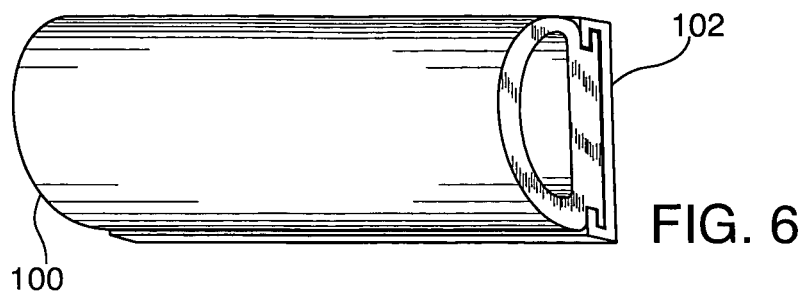
FIG. 6 is a plan view of an alternate embodiment of the present invention.
Figure 7:
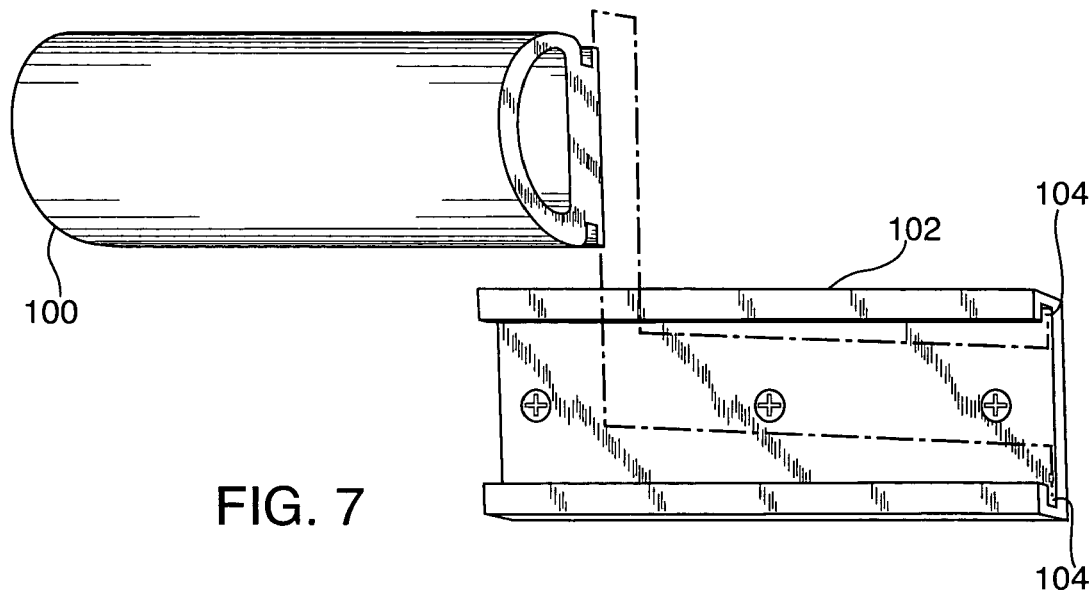
FIG. 7 illustrates the mounting of the embodiment shown in FIG. 6.
Figure 8A:
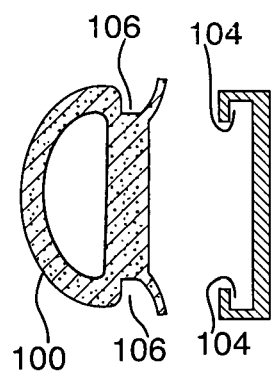
FIG. 8 illustrates a side sectional view of the embodiment illustrated in FIGS. 6 and 7.
Figure 8B:
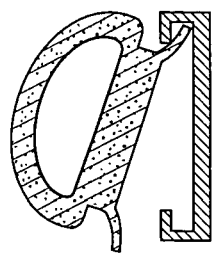
Figure 8C:
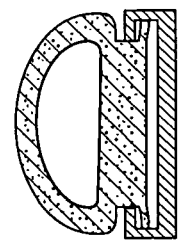

An alternate embodiment of the present invention is illustrated in FIGS. 6, 7, 8. In that embodiment, the guard 100 is mounted in a bracket 102. The bracket 102 comprises longitudinal slots 104 for securing and holding the guard 100 in the bracket. The guard 100 in this embodiment is semi-circular in cross-section and comprises longitudinal slots 106 which are adapted to be received in the bracket 102 by means of slots 104. The installation of guard 100 on bracket 102 is illustrated in FIG. 8. The guard 100 can either slide into the bracket as shown in FIG. 7 or be Flexed-on to the bracket as shown in FIG. 8. The bracket 102 is adapted to be secured to the surface to be protected by means of screws or other known fasteners or even double-backed tape. This embodiment is particularly appropriate for use on loading docks and in boat marinas. This type of installation allows for easy replacement of the guard 100 if necessary. In this embodiment, the guard is fabricated from polyethylene as in the previous embodiment. Although FIGS. 7 and 8 illustrate an embodiment somewhat similar to FIG. 1b, it is also contemplated that the embodiments illustrated in FIGS. 1a and 1c could also be adapted to be mounted by way of a bracket.

As noted above, the length L of the bumper guard 10 can be varied for adaptation to the particular application. For example, a typical length for application to a straight automobile bumper would be about 7.0 inches. Such an application is illustrated in FIG. 3. If the outer wall width and/or height is increased, the amount of resistance to an impact force of the bumper guard is increased. Likewise, decreasing the outer wall width and/or height decreases the amount of resistance to an impact force. In addition, in the embodiment shown in FIG. 2c, the resistance may also be varied by varying the thickness of the spines 15. Thus, by varying the length L and width W and height of the bumper guard 10, the number of distinct potential applications for the present invention is extremely large. It is contemplated that these variations are all obvious modifications to the present invention and fall within its contemplated scope.

Those of ordinary skill in the art will recognize the foregoing description merely illustrates an embodiment of the present invention and many modifications may be made thereto without departing from the spirit or scope of the present invention as set forth in the appended claims.

What is claimed is:

1. A device for protecting a surface from a slow speed collision comprising a resilient compressible material of a length, a width, a height and a cross-section with a semi-circular top and a flat surface wherein the hollow cross-section is generally semi-circular, a partially hollow interior with a plurality of internal spines of rectangular cross-section with a length substantially greater than a width, (means adapted) double-backed tape with covering tape on the flat surface for attaching the devise to the surface to be protected wherein the device will deform from the low-impact collision and then return to its original shape upon removal of the force.

* * * * *